(12) United States Patent
Stojanovic (10) Patent No.: US 8,930,430 B2
(45) Date of Patent: Jan. 6, 2015

(54) CHROMATIC DISPERSION ESTIMATOR AND METHOD FOR ESTIMATING A CHROMATIC DISPERSION

(75) Inventor: Nebojsa Stojanovic, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 13/432,769

(22) Filed: Mar. 28, 2012

(65) Prior Publication Data

US 2012/0213512 A1    Aug. 23, 2012

Related U.S. Application Data

(63) Continuation of application No. PCT/CN2011/071048, filed on Feb. 17, 2011.

(51) Int. Cl.
| | | |
|---|---|---|
| G06F 17/10 | (2006.01) | |
| H04B 17/00 | (2006.01) | |
| H04B 10/2513 | (2013.01) | |
| H04B 10/079 | (2013.01) | |
| H04B 10/61 | (2013.01) | |
| H04L 27/26 | (2006.01) | |

(52) U.S. Cl.
CPC .... *H04B 10/25133* (2013.01); *H04B 10/07951* (2013.01); *H04B 10/6161* (2013.01); *H04L 27/26* (2013.01)
USPC ............................................. 708/300; 398/29

(58) Field of Classification Search
CPC ..................... H04B 10/07951; H04B 10/2507
USPC ....................................... 708/300; 398/29, 81
See application file for complete search history.

(56) References Cited

U.S. PATENT DOCUMENTS

| | | | | |
|---|---|---|---|---|
| 6,643,603 | B2* | 11/2003 | Aoki et al. ..................... | 702/127 |
| 2009/0175629 | A1 | 7/2009 | Liu et al. | |
| 2010/0142946 | A1 | 6/2010 | Liu et al. | |
| 2010/0196009 | A1* | 8/2010 | Qian et al. ...................... | 398/65 |
| 2011/0064421 | A1 | 3/2011 | Zhang et al. | |
| 2012/0070159 | A1* | 3/2012 | Ishihara et al. ............... | 398/202 |
| 2012/0114341 | A1* | 5/2012 | Hu et al. ....................... | 398/208 |
| 2013/0039665 | A1* | 2/2013 | Hauske ........................ | 398/202 |

FOREIGN PATENT DOCUMENTS

| | | |
|---|---|---|
| CN | 101207445 A | 6/2008 |
| CN | 101447834 A | 6/2009 |
| CN | 101753217 A | 6/2010 |
| CN | 101895348 A | 11/2010 |

(Continued)

OTHER PUBLICATIONS

International Serach Report dated Nov. 24, 2011 in connection with International Patent Application No. PCT/CN2011/071048.

(Continued)

*Primary Examiner* — Chuong D Ngo (57) ABSTRACT

A chromatic dispersion estimator for estimating a chromatic dispersion in an input signal block comprises a transformer for transforming the input signal block into a transformed signal block in frequency domain, a chromatic dispersion compensator for compensating a certain chromatic dispersion in the transformed signal block to obtain a compensated transformed signal block, an inverse transformer for inversely transforming the compensated transformed signal block into time domain to obtain an output signal, an adaptive filter for filtering the output signal to obtain a filtered signal, and a determiner for determining upon the basis of the filtered signal whether the certain chromatic dispersion corresponds to the chromatic dispersion in the input signal block.

15 Claims, 5 Drawing Sheets

(56) References Cited

FOREIGN PATENT DOCUMENTS

| CN | 101965698 A | 2/2011 |
|---|---|---|
| WO | WO 2010/108334 A1 | 9/2010 |
| WO | WO 2011/000171 A1 | 1/2011 |

OTHER PUBLICATIONS

Written Opinion of the International Searching Authority dated Nov. 24, 2011 in connection with International Patent Application No. PCT/CN2011/071048.

"Characterization of Communication Signals and Systems", p. 152-323.

F.N. Hauske, et al., "Frequency Domain Chromatic Dispersion Estimation", 2010, 3 pages.

R.D. Gitlin, et al., "Fractionally-Spaced Equalization: An Improved Digital Transversal Equalizer", The Bell System Technical Journal, vol. 60, No. 2, Feb. 1981, p. 275-296.

Ezra Ip, et al., "Digital Equalization of Chromatic Dispersion and Polarization Mode Dispersion", Journal of Lightwave Technology, vol. 25, No. 8, Aug. 2007, p. 2033-2043.

Maxim Kuschnerov, et al., "DSP for Coherent Single-Carrier Receivers", Journal of Lightwave Technology, vol. 27, No. 16, Aug. 15, 2009, p. 3614-3622.

Timo Pfau, et al., "First Real-Time Data Recovery for Synchronous QPSK Transmission With Standard DFB Lasers", IEEE Photonics Technology Letters, vol. 18, No. 18, Sep. 15, 2006, p. 1907-1909.

C.E. Shannon, "A Mathematical Theory of Communication" Reprinted with corrections from The Bell System Technical Journal, vol. 27, July, Oct. 1948, 55 pages.

Extended European Serach Report dated Oct. 24, 2012 in connection with European Patent Application No. 11818936.4, 6 pages.

Savory, et al.; "Electronic compensation of chromatic dispersion using a digital coherent receiver"; XP55040536, Optics Express vol. 15, No. 5, Mar. 5, 2007, 7 pages.

\* cited by examiner

Fig. 9

CHROMATIC DISPERSION ESTIMATOR AND METHOD FOR ESTIMATING A CHROMATIC DISPERSION

CROSS-REFERENCE TO RELATED APPLICATION

This application is a continuation of International Application No. PCT/CN2011/071048, filed on Feb. 17, 2011, entitled "CHROMATIC DISPERSION ESTIMATOR AND METHOD FOR ESTIMATING A CHROMATIC DISPERSION", which is hereby incorporated herein by reference.

TECHNICAL FIELD

The present disclosure relates to the field of digital signal processing and in particular to signal processing for optical receivers.

BACKGROUND

In various data transmission systems, data is transmitted by means of an optical signal over an optical path or optical channel. In a receiver of such a communication system, the optical signal may be transformed to an electrical signal, which may be digitally sampled for further processing.

However, the optical path or optical channel may comprise channel imperfections, such that the received optical signal comprises distortions introduced by the optical path. One of such possible distortions is a chromatic dispersion, according to which different wavelengths of the optical signal are transported with different velocities within an optical medium of the optical path or the optical channel, resulting, for example, in broadened pulses of the received optical signal. To compensate for such distortions, the received signal may be accordingly processed to revert the effects of a certain chromatic dispersion of the optical medium. However, the chromatic dispersion of the optical medium may not be known in advance such that an estimation of the certain chromatic dispersion may be necessary.

Various estimation techniques for estimating a chromatic dispersion may be deployed. For example, an averaging autocorrelation function of the receive signal in the frequency domain may be applied. Furthermore, a mean square error of a compensated signal may be evaluated to find a certain chromatic dispersion. However, such estimation techniques may show a degraded performance regarding polarisation rotation or differential group delay.

SUMMARY

One of the objects of the present disclosure is to provide an efficient concept for estimating a chromatic dispersion of an optical receive signal.

This object is achieved by the features of the independent claims. Further embodiments are apparent from the dependent claims.

The present disclosure is based on the finding that a signal, being processed with a chromatic dispersion compensation procedure employing a certain chromatic dispersion corresponding to a chromatic dispersion of the signal, can be efficiently filtered to obtain a filtered signal having desired properties. Hence, if a certain chromatic dispersion applied in a chromatic dispersion compensation procedure does not correspond to the chromatic dispersion of the signal, a filtered signal with the desired properties may not or only partially be achieved. The compensation and filtering may be tested with different certain chromatic dispersions to find the chromatic dispersion of the signal.

According to a first aspect, the present disclosure relates to a chromatic dispersion estimator for estimating a chromatic dispersion in an input signal block. The chromatic dispersion estimator comprises a transformer for transforming the input signal block into a transformed signal block in frequency domain, a chromatic dispersion compensator for compensating a certain chromatic dispersion in the transformed signal block to obtain a compensated transformed signal block, an inverse transformer for inversely transforming the compensated transformed signal block into time domain to obtain an output signal. The chromatic dispersion estimator further comprises an adaptive filter for filtering the output signal to obtain a filtered signal, and a determiner for determining upon the basis of the filtered signal, whether the certain chromatic dispersion corresponds to the chromatic dispersion in the input signal block.

The transformer may be a Fourier transformer, and the inverse transformer may be an inverse Fourier transformer. In particular, such a Fourier transformer and such an inverse Fourier transformer may be employing a fast Fourier transform, FFT, algorithm.

In the chromatic dispersion compensator, a certain chromatic dispersion within the signal block is compensated in the frequency domain. After transforming the compensated transform signal block into time domain, the resulting output signal is provided to the adaptive filter to obtain the filtered signal. The filtered signal is evaluated within the determiner to find, whether the certain chromatic dispersion used for compensation was chosen appropriately for the chromatic dispersion being present in the input signal block.

According to a first implementation form of the first aspect, the present disclosure relates to a chromatic dispersion estimator, wherein the adaptive filter is configured to repeatedly filter the output signal for adapting filter coefficients towards adapted filter coefficients, and to filter the output signal to obtain a filtered signal using the adapted filter coefficients. For example, the filtered signal to be evaluated in the determiner is not obtained by the adaptive filter with a one-time filter operation, but with repeated filter operations. Hence, the same output signal may be filtered repeatedly to obtain a respective filtered signal, wherein with each filter operation, the filter coefficients of the adaptive filter are adapted, for example on the basis of the output signal and a respective filtered signal values of a previous filter operation. The filtered signal may be provided to the determiner after a certain number of repeated filter operations, for example. Hence, a decision of the determiner whether the certain chromatic dispersion corresponds to the chromatic dispersion in the input signal block may depend on a result of the adaptation algorithm of the adaptive filter.

According to a second implementation form of the first aspect, the present disclosure relates to a chromatic dispersion estimator, wherein the adaptive filter is configured to adapt filter coefficients upon the basis of a constant modulus algorithm by repeatedly filtering the output signal. For example, according to the constant modulus algorithm, it is aimed to adapt the filter coefficients such that a constant modulus property of an input signal can be restored, for example, such that an absolute value is equal or basically equal for all values in the output signal, or that an absolute value is greater than a certain threshold value. If the certain chromatic dispersion does not correspond to the chromatic dispersion in the input signal block, this aim may not be achieved with the constant modulus algorithm, thus indicating a deviation of the certain chromatic dispersion from the chromatic dispersion in the input signal block.

According to a third implementation form of the first aspect, the present disclosure relates to a chromatic dispersion estimator, wherein the adaptive filter is a finite impulse response, FIR, filter. For example, filter coefficients of the FIR filter may be complex valued.

According to a fourth implementation form of the first aspect, the present disclosure relates to a chromatic dispersion estimator, wherein the determiner is configured to evaluate an amplitude distribution of samples of the filtered signal to determine whether the certain chromatic dispersion corresponds to the chromatic dispersion in the input signal block. For example, it is evaluated whether the amplitudes of the samples of the filtered signal show a constant modulus property.

According to a fifth implementation form of the first aspect, the present disclosure relates to a chromatic dispersion estimator, wherein the determiner is configured to determine that the certain chromatic dispersion corresponds to the chromatic dispersion in the input signal block, if a number of samples of the filtered signal having an amplitude being within a certain amplitude range, in particular within a circular amplitude range in a complex amplitude plane, is equal to or smaller than a threshold. For example, if the constant modulus property of a sample is restored, then the filtered sample has a certain amplitude or is within a certain amplitude range. In other words, such samples are outside a certain amplitude range, for example an inner circle of a complex amplitude plane. If only a predefined number, namely the threshold, of samples does not fulfil the requirements of the constant modulus property, it may be assumed that the aim of achieving a constant modulus property of the filtered signal could be achieved. Hence, it can be assumed that the certain chromatic dispersion corresponds to the chromatic dispersion in the input signal block in this case.

According to a sixth implementation form of the first aspect, the present disclosure relates to a chromatic dispersion estimator, wherein the determiner is configured to determine that the certain chromatic dispersion corresponds to the chromatic dispersion in the input signal block, if a number of samples of the filtered signal having an amplitude within a certain amplitude range, in particular within a circular amplitude range in a complex amplitude plane, is smaller than a number of samples of a previously obtained filtered signal having an amplitude within a certain amplitude range. For example, the amplitude distribution of a first filtered signal corresponding to a first certain chromatic dispersion is compared to an amplitude distribution of a second filtered signal of a second certain chromatic dispersion. If the first filtered signal has fewer samples within the certain amplitude range than the second filtered signal, it can be assumed that the first chromatic dispersion corresponds better to the chromatic dispersion in the input signal block than the second chromatic dispersion.

According to a seventh implementation form of the first aspect, the present disclosure relates to a chromatic dispersion estimator, wherein the determiner is configured to trigger the chromatic dispersion compensator to compensate a further certain chromatic dispersion in the transformed signal block to obtain a further compensated transformed signal block, in particular, if the certain chromatic dispersion does not correspond to the chromatic dispersion in the input signal block. The inverse transformer is configured to inversely transform the further compensated transformed signal block into time domain to obtain a further output signal. The adaptive filter is configured to adaptively filter the further output signal to obtain a further filtered signal, and the determiner is configured to determine, upon the basis of the further filtered signal, whether the further certain chromatic dispersion corresponds to the chromatic dispersion in the input signal block. Accordingly, it can be tested for two or more certain chromatic dispersions to find the one certain chromatic dispersion, which corresponds to the chromatic dispersion in the input signal block. The compensation of the respective certain chromatic dispersion is performed on the same transformed signal block for all compensation operations. Hence, results of the compensation, filtering and determination are better comparable.

According to an eighth implementation form, the present disclosure relates to a chromatic dispersion estimator, wherein the chromatic dispersion compensator is configured to process the transformed signal block using a certain transfer function which is associated with a certain chromatic dispersion. For example, coefficients corresponding to such a certain transfer function may be determined in advance on the basis of the certain chromatic dispersion. For example, coefficients CD-1 may be determined according to $$CD_n^{-1}(DL) = \exp\left(-j\left(\frac{2\pi n f_s}{N}\right)^2 \frac{\lambda_0^2 DL}{4\pi c}\right),$$

where $\lambda 0$ is a signal wavelength, fs is a sampling frequency, N is the FFT size, c is the speed of light, n is the tap number of the N coefficients, L is a fiber length, and D is a dispersion coefficient.

According to a ninth implementation form of the first aspect, the present disclosure relates to a chromatic dispersion estimator, wherein the chromatic dispersion compensator is configured to compensate a plurality of certain chromatic dispersions in the transformed signal block in order for the determiner to determine upon the basis of a plurality of corresponding filtered signals provided by the filter whether certain chromatic dispersion of the plurality or certain chromatic dispersions corresponds to the chromatic dispersion in the input signal block.

According to a tenth implementation form of the first aspect, the present disclosure relates to a chromatic dispersion estimator, wherein the input signal block includes a first signal block associated with a first optical polarization and a second signal block associated with a second optical polarization. The transformer is configured to obtain the transformed signal block in frequency domain including a first transformed block associated with the first optical polarization and a second transformed block associated with the second optical polarization. In particular, the transformer transforms the first signal block into the first transformed block and transforms the second signal block into the second transformed block. The chromatic dispersion compensator is configured to obtain the compensated transformed signal block in frequency domain including a first compensated block associated with the first optical polarization, and a second compensated block associated with a second optical polarization. In particular, the first transformed block is processed to obtain the first compensated block and the second transformed block is processed to obtain the second compensated block. The inverse transformer is configured to obtain the output signal including a first signal associated with a first optical polarization and a second signal associated with the second optical polarization. In particular, the first signal is obtained from the first compensated block and the second signal is obtained from the second compensated block. The adaptive filter is configured to filter the first signal and the second signal to obtain the filtered signal, being associated with the first optical polarization. In particular, the adaptive filter may be configured such that the first and the second signal corresponding to the first and the second optical polarization are processed to obtain the filtered signal, which may only be associated with the first optical polarization, but not or only in a negligible order associated with the second optical polarization. For example, the adaptive filter is a multiple input, single output, MISO, filter.

According to an eleventh implementation form of the first aspect, the present disclosure relates to a chromatic dispersion estimator, which comprises an estimation mode for chromatic dispersion estimation, and a compensation mode for compensating chromatic dispersion in an input signal stream. The chromatic dispersion estimator further comprises an input for receiving the input signal block and a switch for decoupling the input from the chromatic dispersion compensator in the estimation mode, and for coupling the input to the chromatic dispersion compensator in the compensation mode. Hence, it can be achieved that the same transformed block is provided to the chromatic dispersion compensator in the estimation mode for estimating the chromatic dispersion in the input signal block, while the transformed signal blocks of the input signal stream can be compensated in the compensation mode.

According to a second aspect, the present disclosure relates to a method for estimating a chromatic dispersion in an input signal block. According to such a method, an input signal block is transformed into a transformed signal block in frequency domain. The method further comprises compensating a certain chromatic dispersion in a transformed signal block to obtain a compensated transformed signal block, inversely transforming the compensated transformed signal block into time domain to obtain an output signal, filtering the output signal to obtain a filtered signal, and determining, upon the basis of the filtered signal, whether the certain chromatic dispersion corresponds to the chromatic dispersion in the input signal block.

According to some implementation forms, filtering the output signal is based on filter coefficients, wherein the filter coefficients are adjusted adaptively upon the basis of a constant modulus algorithm by repeatedly filtering the output signal.

Further implementation forms of the method according to the second aspect of the present disclosure arise from the implementation forms described in conjunction with the first aspect of the invention.

BRIEF DESCRIPTION OF THE DRAWINGS

Further embodiments of the invention will be described with reference to the following figures, in which.

DETAILED DESCRIPTION

Figure 1:
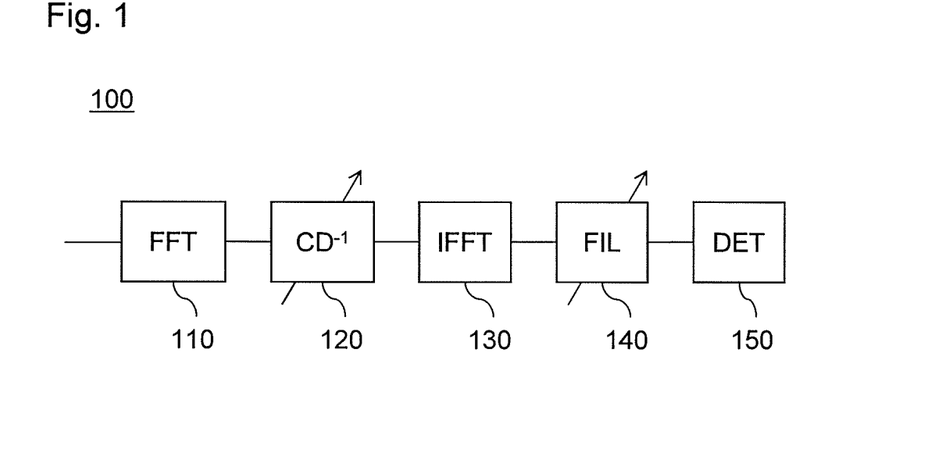
FIG. 1 shows a chromatic dispersion estimator according to an implementation form.

FIG. 1 shows an implementation form of a chromatic dispersion estimator 100 comprising a transformer 110, a chromatic dispersion compensator 120, an inverse transformer 130, an adaptive filter 140 and a determiner 150. The transformer 110 is configured to transform an input signal block at its input into a transformed signal block in frequency domain at its output for providing it to the chromatic dispersion compensator 120. For example, the transformer 110 employs an FFT algorithm and is adapted to transform a complex valued input signal block in time domain into a complex valued transformed block in frequency domain. The input signal block may be a block of digitally sampled values of an electrical signal, which is derived from an optical signal and is received over an optical channel, for example an optical fiber.

The chromatic dispersion compensator 120 is set to a certain chromatic dispersion to be compensated, for example by providing a set of complex compensation coefficients to the compensator 120, the said resulting in a certain transfer function being adapted for compensating the certain chromatic dispersion. Hence, at an output of the compensator 120, a compensator transformed signal block is provided and further processed by the inverse transformer 130. In particular, the inverse transformer is configured to transfer the compensated transformed signal block into time domain to obtain an output signal. For example, in the inverse transformer, an inverse FFT, IFFT, algorithm is used.

The output signal is filtered in the adaptive filter 140 to obtain a filtered signal, which is provided to the determiner 150. The filtering can comprise several stages of adaptation of filter coefficients of the adaptive filter 140, wherein the adaptation may be based on the output signal and/or the filtered signal of each adaptation stage.

The determiner 150 is configured to determine upon the basis of the filtered signal whether the certain chromatic dispersion employed in the chromatic dispersion compensator 120 corresponds to a chromatic dispersion in the input signal block.

For example, the determiner 150 checks whether the filtered signal, in particular the filtered signal after a last adaptation stage, has desired properties which indicate that a chromatic dispersion in the input signal block was successfully compensated with the certain chromatic dispersion, such that the certain chromatic dispersion corresponds to the chromatic dispersion in the input signal block. To this end, an amplitude distribution of the filtered signal may be evaluated in the determiner 150. The above-described procedure may be repeated with a plurality of certain chromatic dispersions used for compensating in the compensator 120 in order to find the chromatic dispersion in the input signal block. Thus, the chromatic dispersion of the input signal block can be estimated.

For example, the input signal block includes a first signal block associated with a first optical polarization and a second signal block associated with a second optical polarization. Accordingly, the transformer 110, the compensator 120 and the inverse transformer 130 are configured to process respective blocks associated with the first and the second optical polarization. Hence, also the output signal comprises a first signal and a second signal associated with the first and the second optical polarization, respectively.

Figure 2:
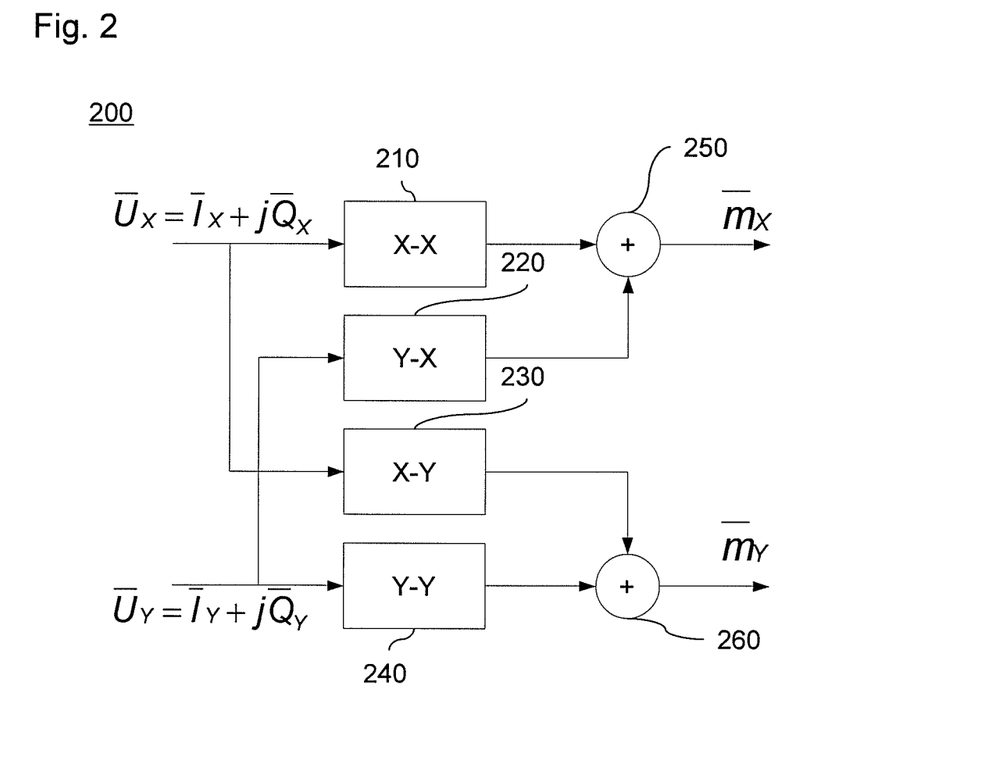
FIG. 2 shows a filter according to an implementation form.

FIG. 2 shows an implementation form of an adaptive filter 200, which is configured to process two complex valued input signals, for example the first signal and the second signal. For example, the first signal is associated with an X-polarization and can be written as a complex valued signal $$\overline{U}_Y = \overline{I}_Y + j\overline{Q}_Y,$$

and the second signal is associated with a Y-polarization and can be written as a complex valued signal $$\overline{U}_Y = \overline{I}_Y + j\overline{Q}_Y.$$

The filter 200 is a multiple input, multiple output, MIMO, filter with two inputs and two outputs. The filter 200 comprises four filter blocks 210, 220, 230 and 240, wherein filter block 210 belongs to an X-to-X relationship, filter block 220 belongs to an Y-to-X-relationship, filter block 230 belongs to an X-to-Y relationship and filter block 240 belongs to an Y-to-Y-relationship. Accordingly, the outputs of the filter blocks 210, 220 are summed up in a first summation element 250, and the outputs of the filter blocks 230, 240 are summed up in a second summation element 260.

Hence, the filter 200 outputs two complex values $$\overline{m}_X = \overline{W}_X^H \overline{U}_X, \overline{m}_Y = \overline{W}_Y^H \overline{U}_Y,$$

where $$\overline{U}_X = \begin{pmatrix} \overline{u}_X \\ \overline{u}_Y \end{pmatrix}; \overline{W}_X = \begin{pmatrix} \overline{h}_{XX} \\ \overline{h}_{YX} \end{pmatrix};$$

$$\overline{U}_Y = \begin{pmatrix} \overline{u}_Y \\ \overline{u}_X \end{pmatrix}; \overline{W}_X = \begin{pmatrix} \overline{h}_{YY} \\ \overline{h}_{XY} \end{pmatrix}$$

and where complex vectors $\overline{h}$ present complex filter coefficients.

Adaptation elements of the filter 200 are not shown here for the reasons of a better overview. However, coefficients of the filter blocks 210, 220, 230, 240 are adapted such that a desired constellation of samples of the filtered signal may achieve a desired distribution in the complex plane.

Figure 3:
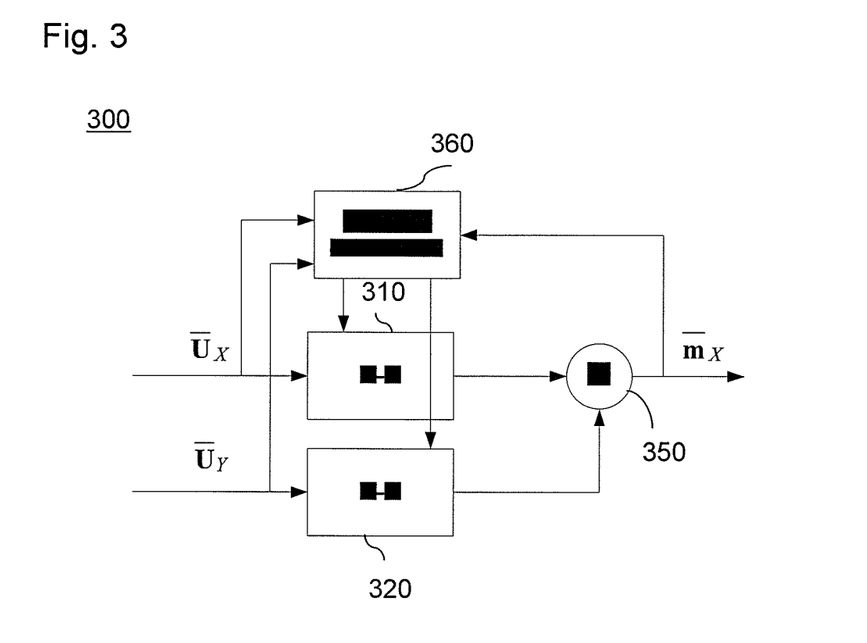
FIG. 3 shows an adaptive filter according to an implementation form.

FIG. 3 shows an implementation form of an adaptive filter 300 which is embodied as a MISO-filter with two filter inputs and one filter output. The filter 300 comprises a first and a second filter block 310, 320 and a summation element 350. For example, the filter blocks 310, 320 may correspond two filter blocks 210, 220 of the filter 200, while the summation element 350 corresponds to the first summation element 250. The filter 300 further comprises an adaptation block 360 which is configured to perform a calculation of adaptation of the filter coefficients or taps of the filter blocks 310, 320. For example, the filter taps are updated using a constant modulus algorithm, CMA, which takes the output signals $\overline{U}_X$, $\overline{U}_Y$ and the filtered signal $\overline{m}_X$ as an input for adaptation block 360. For example, the filter taps or filter coefficients are updated according to:

$$\overline{W}_{k+1} = (1-\alpha)\overline{W}_k + \mu e_k \overline{m}^*_k \overline{U}_k,$$

with $$e_k = 1 - |\overline{m}_k|^2,$$

where μ is an update coefficient, k is a running number of iterations of the adaptation algorithm and α is a leakage factor. The error ek is calculated using samples from the X-polarization in this example.

Figure 4:
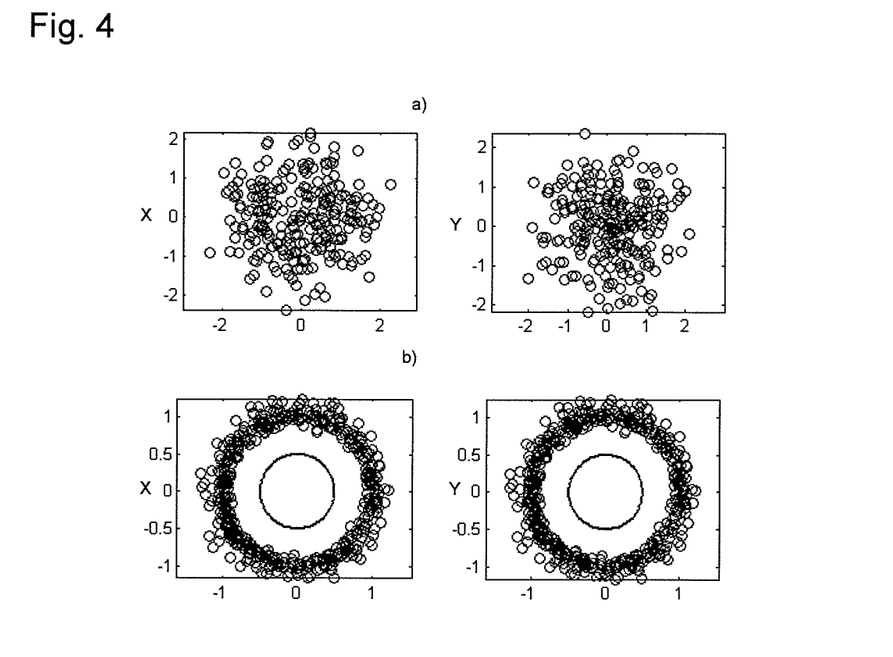
FIG. 4 shows exemplary constellation diagrams according to an implementation form.

In FIG. 4, signal constellations of exemplary QPSK-signals for both an X-polarization and a Y-polarization are shown. FIG. 4A shows the signal constellation of the samples before the adaptive filter, and FIG. 4B shows the signal constellation after filtering. It can be seen that after FIR filtering the output constellation is arranged circularly around the origin in the complex plane, and out of a forbidden or unwanted range denoted by the circle.

In the signals of FIG. 4, the certain chromatic dispersion employed in the chromatic dispersion compensator corresponds to the chromatic dispersion in the input signal block such that the filter was able to be adapted to restore the constant modulus property within the filtered signal.

If a residual dispersion, RD, namely the remaining chromatic dispersion within the compensated signal, is too high because the certain chromatic dispersion does not correspond to the chromatic dispersion in the input signal block, the filter may not be able to clean the area within the circle. Hence, if a number of samples in the filtered signal being located within the circle, namely having an amplitude being smaller than the radius of the circle, is smaller than a threshold, then it can be assumed that a residual dispersion is neglectably small and the certain chromatic dispersion employed in the chromatic dispersion compensator corresponds to the actual chromatic dispersion in the input signal block.

For example, the adaptive filter is able to perform a polarization decoupling, a phase-mode dispersion, PMD, compensation and a residual chromatic dispersion compensation. A number of coefficients of each of the filter blocks may be in the range of 9 to 15 taps, for example, if two samples per symbol interval are to be processed.

Figure 5:
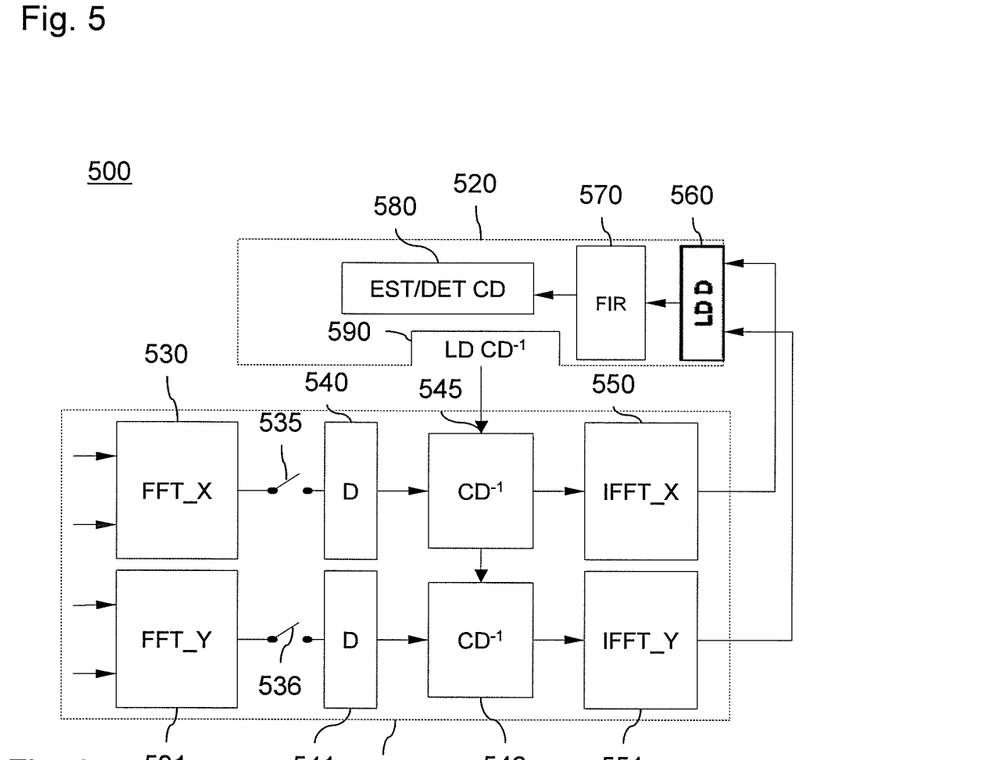
FIG. 5 shows a chromatic dispersion estimator according to an implementation form.

FIG. 5 shows a further implementation form of a chromatic dispersion estimator 500. The chromatic dispersion estimator 500 comprises a first processing block 510, which may be embodied in hardware, and a second processing block 520, which may embodied in software, for example by means of a digital signal processor.

The first processing block 510 comprises transformers 530, 531 for performing a transformation of an input signal block into frequency domain for X-polarization and Y-polarization, respectively. Outputs of the transformers 530, 531 are connected to data blocks 540, 541 for storing transformed signal blocks by means of switches 535, 536. If switches 535, 536 are closed, new output data of the transformers 530, 531 can be provided to the data blocks 540, 541. However, the content of the data blocks 540, 541 remains unchanged, if the switches 535, 536 are open. The signal blocks stored in the data blocks 540, 541 are provided to the chromatic dispersion compensators 545, 546 which perform compensation with a certain chromatic dispersion provided by the second processing block 520. The compensated blocks, which are output by the chromatic dispersion compensators 545, 546, are inversely transformed to time domain by the inverse transformers 550, 551.

The second processing block 520 comprises a loading block 560, an FIR filter 570, a determiner 580 and a control block 590. The loading block 560 is configured to load a certain number of output samples of the inverse transformers 550, 551 for further processing by the adaptive filter 570. For example, the adaptive filter 570 may be embodied according to the implementation forms described for filters 200 and 300 above. The filtered signal is evaluated by the determiner 580, for example, to determine whether a signal constellation of the filtered signal fulfills a desired amplitude distribution requirement as described in accordance with FIG. 4. The evaluation result may be stored, for example for a later comparison with other evaluation results. In particular, by means of the control block 590, another certain chromatic dispersion can be loaded to the compensators 555, 556 in order for the compensators 555, 556 to process the signal blocks stored in the data blocks 540, 541 with a different chromatic dispersion.

For example, the certain chromatic dispersion, on which the compensation and the compensators 545, 546 are based, is swapped over a predefined range of chromatic dispersions with a predetermined step. The same signal blocks are compensated and provided to the second processing block 520, such that for each compensated block a filtering operation with adaptation of the filter coefficients is performed. Further, for each filtered signal, an evaluation is performed, in particular a determination of a residual dispersion and/or an evaluation of the amplitude distribution of the filtered signal. After the last evaluation or filter operation, respectively, one of the certain chromatic dispersions, which were used for compensation, may be chosen as the estimated chromatic dispersion in the input signal block, for example the one having the least residual dispersion.

For example, if an "add and safe" FFT method is applied, half of the samples in the middle of a respective data block are correctly chromatic dispersion compensated in the compensated output block. Hence, half of the samples from the middle of the IFFT output block may be loaded to the second processing block 520. The number of loaded samples may be smaller, but should not be bigger, if the above-mentioned FFT method is used. Hence, if an FFT size N=1024 is assumed, 512 samples may be passed through the filter 570. Assuming M filter taps for the filters, the filter may be run $N/2-M_+1$ times, such that $N/2-M_+1$ output samples are available. Each output sample may be used for filter taps update. This procedure may be repeated L-times for each value of chromatic dispersion RD from a minimum chromatic dispersion RDmin to a maximum value of chromatic dispersion RDmax with a step size of RDS. Output samples within a cycle defined by its radius R in the complex plane may be counted for each RD value for both polarizations and stored in an error parameter RDE(i), where i denotes an i-th RD value. In the end, the RD value producing the minimum of RDE may be selected. The estimation may be further improved, if the closest neighboring minimum is used for RD interpolation.

Assuming that these values are RD(i) and RD(i+1), then the interpolated value can be calculated by $$RDest = RD(k) + \frac{RDS}{\sqrt{\frac{RDE(k+1)+\xi}{RDE(k)+\xi}}+1},$$

where $\xi \ll 1$ may be used to avoid a division by zero.

Figure 6:
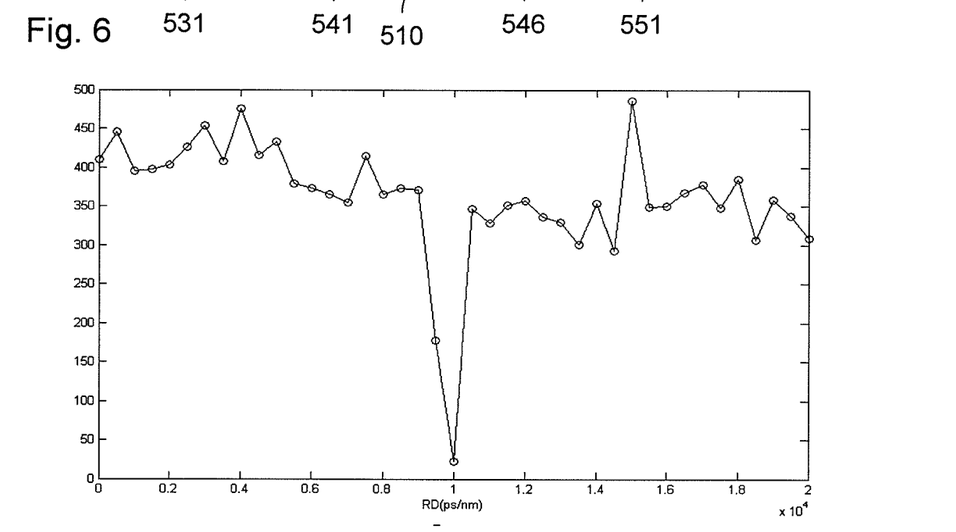
FIG. 6 shows a residual dispersion diagram according to an implementation form.

FIG. 6 shows an exemplary residual dispersion diagram, in which, for example, the number of samples within the amplitude radius R are shown over the RD values used for compensation. Hence, in this example, a chromatic dispersion of 10,000 ps/nm can be assumed for the input signal.

Figure 7:
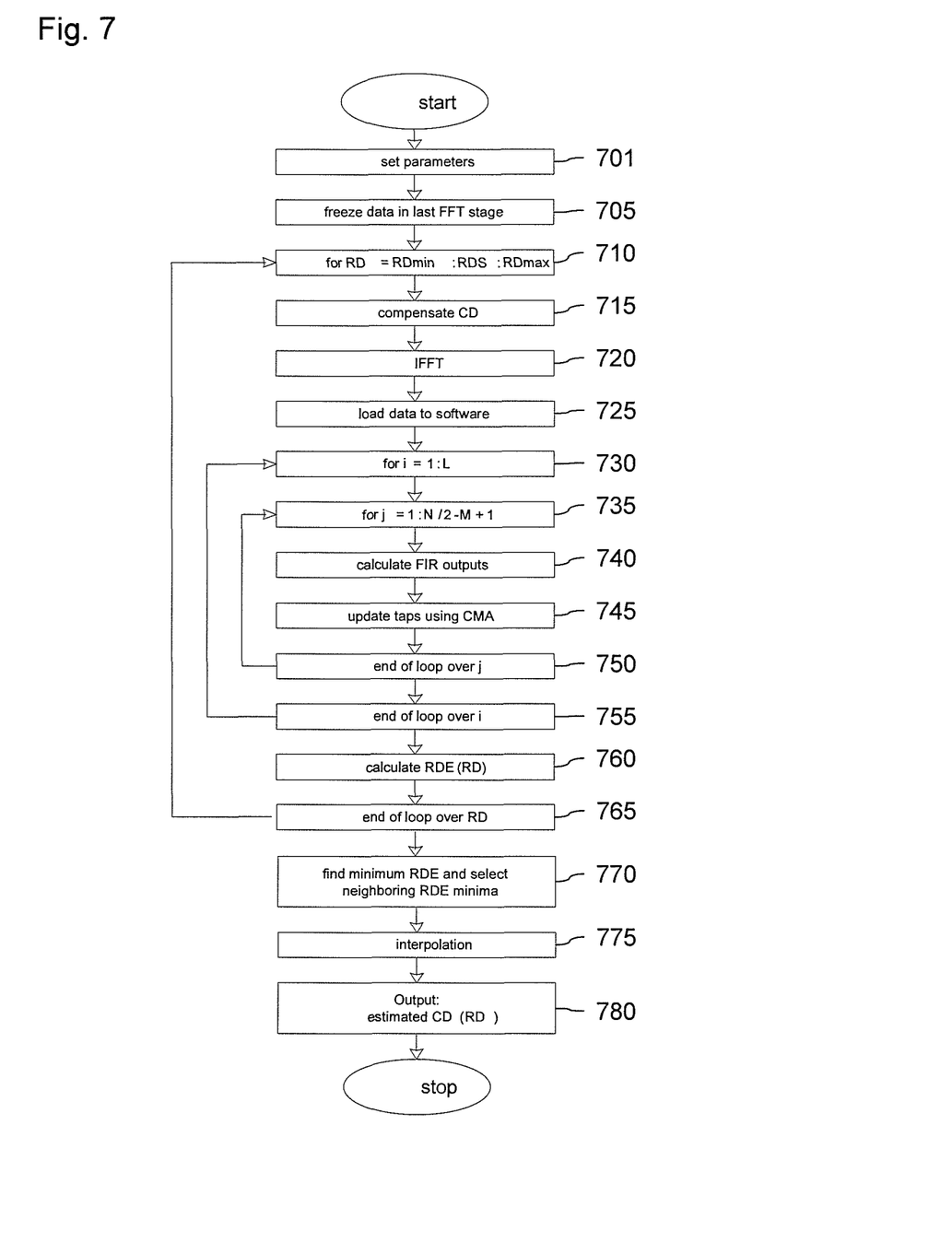
FIG. 7 shows a method for estimating a chromatic dispersion according to an implementation form.

FIG. 7 shows a flowchart of the chromatic dispersion estimation method which may be performed in the above described arrangements. In step 701, parameters of the estimation algorithm are set, for example values for RDmin, RDS, RDmax., FFT size N, filter length M or the number of filter repetitions L. Input signal blocks are transformed to frequency domain in block 705 and frozen such that the same transformed blocks can be used for all further operations.

In step 710, a loop over chromatic dispersion values RD is started with a minimum chromatic dispersion value RDmin which is increased by a step-size RDS up to a maximum chromatic distortion value RDmax.

In step 715, a chromatic dispersion in the transformed signal block is compensated with the actual RD value. The compensated block is transformed to the time domain by an inverse FFT in step 720. Assuming an FFT size N, N/2 samples of the time domain output signal are loaded to evaluation software, for example embodied in the second processing block 520 which may be realized with a digital signal processor.

In step 730, a loop over L iterations for filter processing is started. In block 735, a loop for calculating N/2-M+1 output samples of a filter is started, wherein in step 740 the output samples of the FIR filter are calculated, and in step 745 coefficients of the FIR filter are updated using a constant modulus algorithm, CMA. In step 750, a loop to step 735 is closed, while in step 755, the respective loop to step 730 is closed.

After finishing the filter loops, in step 760, an error value RDE is calculated for the actual RD value. In step 765, it is looped back to step 710 for selecting the next RD value or, if RDmax has been reached, it is continued with step 770. In step 770, the minimum RDE value is found, and the respective RD value for chromatic dispersion may be selected. The method may be stopped here. However, to possibly improve the result of the chromatic dispersion estimation, neighboring RDE minima can be selected and an interpolation, in step 775, could be started. In the end, in step 780, the estimated chromatic dispersion based on the selected RD value can be output.

Figure 8:
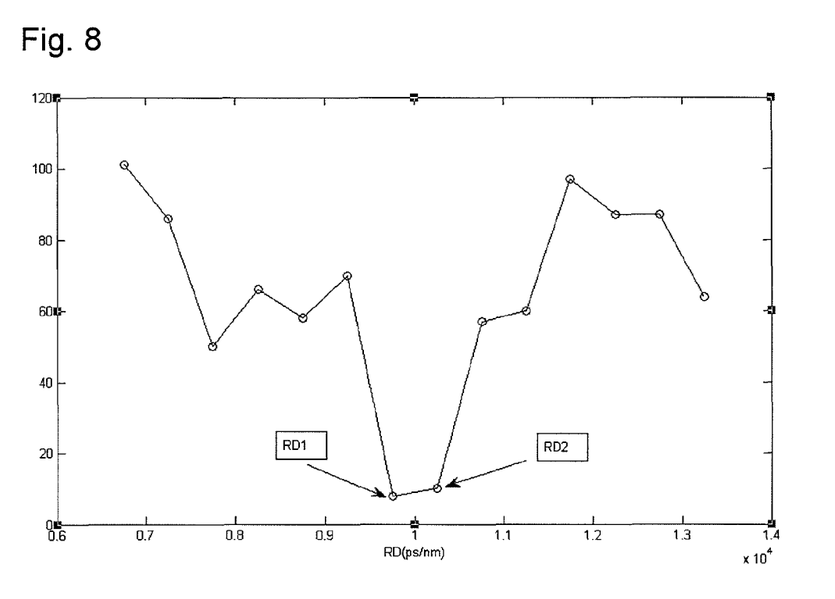
FIG. 8 shows a residual dispersion diagram according to an implementation form.

With respect to the interpolation, FIG. 8 shows a residual dispersion diagram, from which can be seen that two RD values RD1, RD2 with comparable low numbers of samples within the circle are found. It may therefore be assumed that a further minimum of RDE can be found between chromatic dispersion values RD1, RD2. Accordingly, a similar procedure as described above can be repeated with new values for RDmin and RDmax, namely RDmin=RD1 and RDmax=RD2. A smaller step size RDS may be chosen accordingly.

Figure 9:
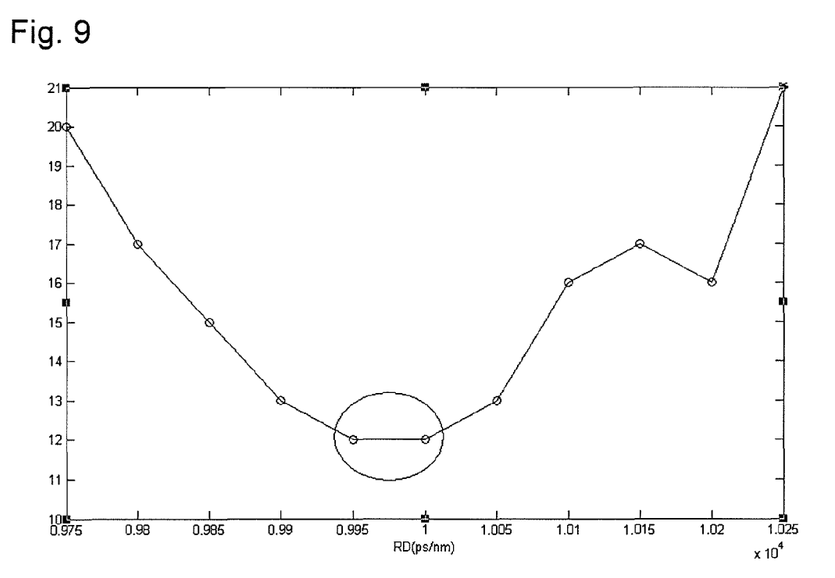
FIG. 9 shows a residual dispersion diagram according to an implementation form.

As a result, FIG. 9 shows an exemplary residual dispersion diagram with the repeated chromatic dispersion estimation, resulting in a minimum to be found for the RD values around 9950 ps/nm and 10000 ps/nm marked with a circle. The procedure may be repeated again, or one of the two RD values could be taken as the estimated chromatic dispersion.

What is claimed is:

1. A chromatic dispersion estimator for estimating a chromatic dispersion in an input signal block, the chromatic dispersion estimator comprising:
    a transformer for transforming the input signal block into a transformed signal block in frequency domain;
    a chromatic dispersion compensator for compensating a certain chromatic dispersion in the transformed signal block to obtain a compensated transformed signal block;
    an inverse transformer for inversely transforming the compensated transformed signal block into time domain to obtain an output signal;
    an adaptive filter for filtering the output signal to obtain a filtered signal; and
    a determiner for determining upon the basis of the filtered signal whether the certain chromatic dispersion corresponds to the chromatic dispersion in the input signal block.

2. The chromatic dispersion estimator of claim 1, wherein the adaptive filter is configured to repeatedly filter the output signal for adapting filter coefficients towards adapted filter coefficients, and to filter the output signal to obtain a filtered signal using the adapted filter coefficients.

3. The chromatic dispersion estimator of claim 1, wherein the adaptive filter is configured to adapt filter coefficients upon the basis of a constant modulus algorithm by repeatedly filtering the output signal.

4. The chromatic dispersion estimator of claim 1, wherein the adaptive filter is a finite impulse response filter.

5. The chromatic dispersion estimator of claim 1, wherein the determiner is configured to evaluate an amplitude distribution of samples of the filtered signal to determine whether the certain chromatic dispersion corresponds to the chromatic dispersion in the input signal block.

6. The chromatic dispersion estimator of claim 1, wherein the determiner is configured to determine that the certain chromatic dispersion corresponds to the chromatic dispersion in the input signal block if a number of samples of the filtered signal having an amplitude being within a certain amplitude range, in particular within a circular amplitude range in a complex amplitude plane, is equal to or smaller than a threshold.

7. The chromatic dispersion estimator claim 1, wherein the determiner is configured to determine that the certain chromatic dispersion corresponds to the chromatic dispersion in the input signal block if a number of samples of the filtered signal having an amplitude within a certain amplitude range, in particular within a circular amplitude range in a complex amplitude plane, is smaller than a number of samples of a previously obtained filtered signal having an amplitude within the certain amplitude range.

8. The chromatic dispersion estimator of claim 1, wherein the determiner is configured to trigger the chromatic dispersion compensator to compensate a further certain chromatic dispersion in the transformed signal block to obtain a further compensated transformed signal block if the certain chromatic dispersion does not correspond to the chromatic dispersion in the input signal block, wherein the inverse transformer is configured to inversely transform the further compensated transformed signal block into time domain to obtain a further output signal, wherein the adaptive filter is configured to adaptively filter the further output signal to obtain a further filtered signal, and wherein the determiner is configured to determine upon the basis of the further filtered signal whether the further certain chromatic dispersion corresponds to the chromatic dispersion in the input signal block.

9. The chromatic dispersion estimator of claim 1, wherein the chromatic dispersion compensator is configured to process the transformed signal block using a certain transfer function which is associated with the certain chromatic dispersion.

10. The chromatic dispersion estimator of claim 1, wherein the chromatic dispersion compensator is configured to compensate a plurality of certain chromatic dispersions in the transformed signal block in order for the determiner to determine, upon the basis of a plurality of corresponding filtered signals provided by the filter, which certain chromatic dispersion of the plurality of certain chromatic dispersions corresponds to the chromatic dispersion in the input signal block.

11. The chromatic dispersion estimator of claim 1,
wherein the input signal block includes a first signal block associated with a first optical polarization and a second signal block associated with a second optical polarization;
wherein the transfoti ler is configured to obtain the transformed signal block in frequency domain including a first transformed block associated with the first optical polarization and a second transformed block associated with the second optical polarization;
wherein the chromatic dispersion compensator is configured to obtain the compensated transformed signal block in frequency domain including a first compensated block associated with the first optical polarization and a second compensated block associated with the second optical polarization;
wherein the inverse transformer is configured to obtain the output signal including a first signal associated with the first optical polarization and a second signal associated with the second optical polarization; and
wherein the adaptive filter is configured to filter the first signal and the second signal to obtain the filtered signal being associated with the first optical polarization.

12. The chromatic dispersion estimator of claim 1, wherein the transformer is a Fourier transformer, and wherein the inverse transformer in an inverse Fourier transformer.

13. The chromatic dispersion estimator of claim 1, comprising an estimation mode for chromatic dispersion estimation, and a compensation mode for compensating chromatic dispersion in an input signal stream, wherein the chromatic dispersion estimator further comprises an input for receiving the input signal block, and a switch for decoupling the input from the chromatic dispersion compensator in the estimation mode, and for coupling the input to the chromatic dispersion compensator in the compensation mode.

14. A method for estimating a chromatic dispersion in an input signal block, the method comprising:
transforming, by a transformer, an input signal block into a transformed signal block in frequency domain;
compensating, by a chromatic dispersion compensator, a certain chromatic dispersion in the transformed signal block to obtain a compensated transformed signal block;
inversely transforming ,by, an inverse transformer, the compensated transformed signal block into time domain to obtain an output signal;
filtering, by a filter, the output signal to obtain a filtered signal; and
determining, by a determiner, upon the basis of the filtered signal whether the certain chromatic dispersion corresponds to the chromatic dispersion in the input signal block.

15. The method of the preceding claim 14, wherein filtering the output signal is based on filter coefficients, and wherein the filter coefficients are adjusted adaptively upon the basis of a constant modulus algorithm by repeatedly filtering the output signal.

* * * * *